(12) United States Patent
Halalay et al.

(10) Patent No.: US 9,362,542 B2
(45) Date of Patent: Jun. 7, 2016

(54) LITHIUM ION BATTERY COMPONENTS WITH CHELATING AGENTS HAVING ORIENTED PERMANENT DIPOLE MOMENTS

(71) Applicant: GM GLOBAL TECHNOLOGY OPERATIONS LLC, Detroit, MI (US)

(72) Inventors: Ion C. Halalay, Grosse Pointe Park, MI (US); Timothy J. Fuller, Pittsford, NY (US); Zicheng Li, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 14/492,365

(22) Filed: Sep. 22, 2014

(65) Prior Publication Data

US 2015/0093628 A1     Apr. 2, 2015

Related U.S. Application Data

(60) Provisional application No. 61/884,763, filed on Sep. 30, 2013.

(51) Int. Cl.
| | |
|---|---|
| *H01M 2/16* | (2006.01) |
| *H01M 4/62* | (2006.01) |
| *H01M 2/14* | (2006.01) |
| *H01M 10/0525* | (2010.01) |
| *H01M 10/0585* | (2010.01) |
| *H01M 10/42* | (2006.01) |

(52) U.S. Cl.
CPC ............ *H01M 2/1686* (2013.01); *H01M 2/145* (2013.01); *H01M 2/1653* (2013.01); *H01M 4/628* (2013.01); *H01M 10/0525* (2013.01); *H01M 10/0585* (2013.01); *H01M 10/4235* (2013.01); *Y02E 60/122* (2013.01)

(58) Field of Classification Search
CPC .................... H01M 10/0525; H01M 10/0585; H01M 2/145; H01M 2/1653; H01M 2/1686; H01M 4/628; Y02E 60/122
See application file for complete search history.

(56) References Cited

U.S. PATENT DOCUMENTS

| | | |
|---|---|---|
| 5,130,211 A | 7/1992 | Wilkinson et al. |
| 6,689,513 B1 | 2/2004 | Morigaki et al. |
| 7,022,812 B2 | 4/2006 | Yoshimura et al. |
| 7,282,109 B2 | 10/2007 | Takata et al. |
| 2010/0239900 A1 | 9/2010 | Take et al. |
| 2011/0117413 A1 | 5/2011 | Wang et al. |
| 2011/0151333 A1 | 6/2011 | Halalay et al. |

OTHER PUBLICATIONS

Walkowiak, et al., Macrocycle Carriers for Separation of Metal Ions in Liquid Membrane Process—A Review, Desalination 240, 1999, pp. 186-197.

(Continued)

*Primary Examiner* — Patrick Ryan
*Assistant Examiner* — Ben Lewis
(74) *Attorney, Agent, or Firm* — Dierker & Kavanaugh, P.C.

(57) ABSTRACT

One example of a lithium ion battery component is a lithium ion battery separator including a planar microporous polymer membrane and a chelating agent bonded to the planar microporous polymer membrane through a linking group. The chelating agent is bonded such that the permanent dipole moment of the chelating agent is oriented perpendicular to the plane of the planar microporous polymer membrane.

19 Claims, 4 Drawing Sheets

(56) References Cited

OTHER PUBLICATIONS

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

Smid, J., et al., "Synthesis of 4'-Vinylbenzocrown Ethers", Organic Preparations and Procedures Int. 8(4), 1976, pp. 193-196.

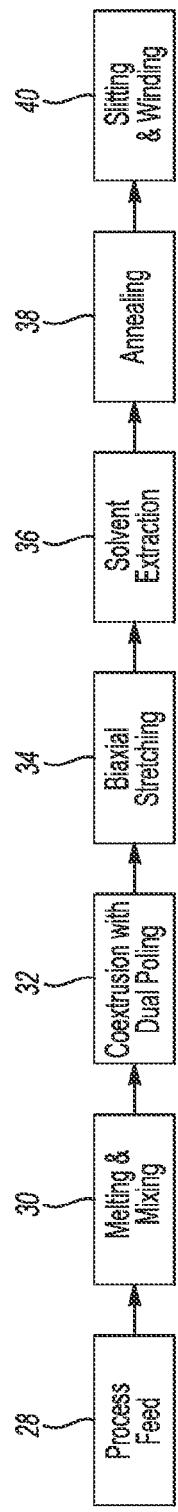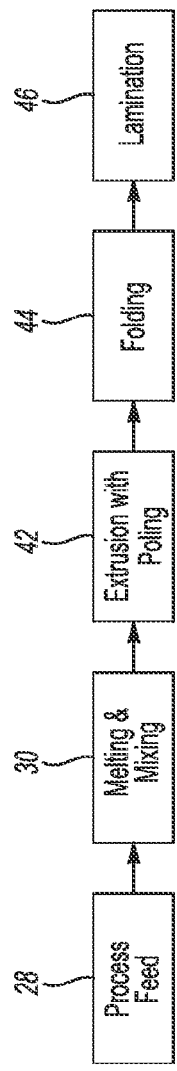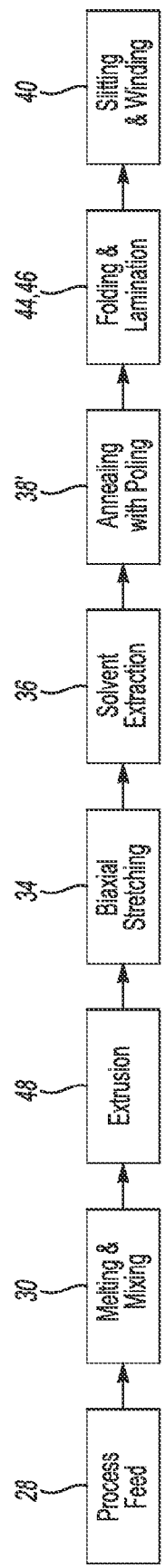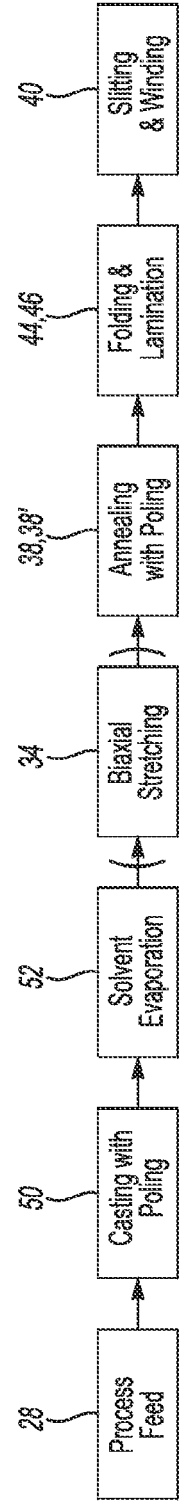

LITHIUM ION BATTERY COMPONENTS WITH CHELATING AGENTS HAVING ORIENTED PERMANENT DIPOLE MOMENTS

CROSS-REFERENCE TO RELATED APPLICATIONS

This application claims the benefit of U.S. Provisional Patent Application Ser. No. 61/884,763, filed Sep. 30, 2013, which is incorporated by reference herein in its entirety.

TECHNICAL FIELD

The present disclosure relates generally to lithium ion battery components with chelating agents having oriented permanent dipole moments.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium ion batteries to undergo such repeated cycling over their useful lifetimes makes them attractive and dependable electrical energy storage devices.

SUMMARY

One example of a lithium ion battery component is a lithium ion battery separator including a planar microporous polymer membrane and a chelating agent bonded to the planar microporous polymer membrane such that a permanent dipole moment of the chelating agent is oriented perpendicular to the plane of the planar microporous polymer membrane.

BRIEF DESCRIPTION OF THE DRAWINGS

Features and advantages of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

FIGS. 6 through 12 are flow diagrams illustrating different examples of the method disclosed herein.

DETAILED DESCRIPTION

Figure 1:
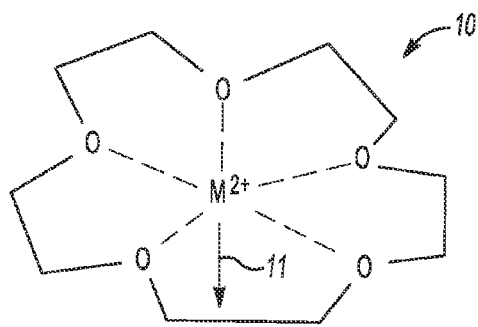
FIG. 1 is an illustration of a crown ether trapping a manganese cation, the crown ether having a permanent dipole moment.

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in an aprotic non-aqueous solvent.

It has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning". In one example, a graphite electrode is poisoned by $Mn^{+2}$, $Mn^{+3}$, or $Mn^{+4}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn atoms can poison the graphite electrode and prevent reversible electrode operation, thereby reducing the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge–discharge cycling).

The poisoning of the lithium ion battery by transition metals dissolving from the positive electrode may be reduced or prevented by incorporating an example of the separator and/or positive electrode disclosed herein into the battery. Examples of the separator(s) and the positive electrode(s) disclosed herein include a macrocycle functionalized polymer, either as the matrix of the separator or in a coating on a separator membrane or an electrode structure (i.e., within a positive electrode). The macrocycle functionalized polymer includes a chelating agent(s) chemically bonded to a polymer backbone. A linking group attaches the chelating agent to the polymer backbone. Generally, multiple chelating agents are chemically bonded to the polymer backbone, and these agents may all be of the same type, or two or more different types of chelating agents may be used. The chelating agent(s) has/ have a permanent dipole moment that is oriented perpendicular to the plane of the separator and/or positive electrode.

Suitable chelating agents include metal ionophores, which, as used herein, are chemical compounds that bind to particular ions (e.g., $Mn^{+2}$, $Mn^{+3}$, or other transition metal cations) while allowing the passage of lithium ions. One example of the chelating agent 10 is shown in FIG. 1. Inside the battery, the chelating agent 10 is tethered (i.e., chemically bonded) to the polymer backbone (not shown in FIG. 1) so that the permanent dipole moment 11 of the chelating agent 10 is oriented perpendicularly to the plane of the separator and/or positive electrode. The oriented chelating agent 10 preferentially traps the unwanted metal cations (e.g., $M^{2+}$ shown in FIG. 1) and the movement of lithium ions across the separator is not affected during operation of the battery. In an example, the chelating agent 10 selectively complexes with the unwanted metal cations, for example, by immobilizing the metal cations (e.g., $Co^{+2}$, $Fe^{+2}$, $Mn^{+2}$, $Mn^{+3}$, $Ni^{+2}$, etc.) that dissolve into the electrolyte solution from the positive electrode. The tethered chelating agents 10 thus operate as metal cation scavenger molecules that trap and immobilize the unwanted metal cations to prevent the migration of the metal cations through the electrolyte solution and to prevent their deposition at the negative electrode. It is to be understood that the chelating agents 10 complex less strongly with lithium ions (e.g., a single trapping site out of each one hundred sites are occupied by a $Li^+$ cation as compared to a $Mn^{+2}$ cation), and thus do not adversely affect the movement of lithium ions between the negative and positive electrodes. Since the potential energy of a dipole p in an electric field E is $-p \cdot E$ (with the symbol "·" denoting the scalar product operation between the vectors p and E), it is believed that orienting the permanent dipole moments of the chelating agents perpendicular to the plane of the lithium ion battery component will increase the transition metal cation trapping ability of the chelating agents.

In the examples disclosed herein the chelating agent 10 is tethered (i.e., chemically bonded) to the polymer backbone through a linker (i.e., linking group), such as $-CH_2-$, an ethoxy group, a methoxy group, an undecylenyl group, or the like. More generally, the linking group can be an alkyl, an ester, an amide, an ether, or an isocyanate. Depending on the chemical synthesis of the macrocycle functionalized polymer, the linker may be first attached to the chelating agent 10 or to the polymer backbone.

The chelating agent 10 may be any crown ether, any crown ether having at least one ether oxygen substituted by a heteroatom, any cryptand, any podand, any lariat ether, any calixarene, and/or any calixcrown having a permanent dipole moment. Example structures have an odd number of oxygen atoms (which may be partially aza- (i.e., N atom) or thia- (i.e., S atom) substituted), or have an otherwise asymmetric structure, or have a symmetric structure where one or more aza- or thia-substitutions break the symmetry of the charge distribution.

A crown ether is a cyclic ether in which the ether ring includes oxygen atoms that can complex with a transition metal cation. In many examples, the cyclic ether is a macrocycle. Some or all of the oxygen atoms in the ether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a metal cation, or polycyclic, in which the crown ether forms a more three-dimensional cage for complexing with a metal cation. One example of a polycyclic crown ether is a cryptand (such as, e.g., cryptand [2.2.2], cryptand [2.2.1], and cryptand [2.1.1]). One or more oxygen atoms in the cryptand or other crown ether may also be substituted at any location along its ether ring by any of a variety of atoms known to those skilled in the art. For example, the cryptand may include sulfur substituted at one or more oxygen sites, or may include nitrogen substituted at one or more oxygen sites.

It is believed that crown ethers having structures where i) the size of the cavity defined by the crown structure has a diameter that is close to the size of the ion (e.g., the transition metal cation) to be trapped, and ii) a net separation exists between positive and negative electrical charges of the structure which creates a permanent dipole moment, are the most effective examples of the improved lithium battery disclosed herein.

Further, a podand is an acyclic polyether ligand that includes donor-group-bearing arms that can complex with a metal cation. A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calixcrown is a calixarene that includes a polyether ring that links two phenolic oxygens of the calixarene framework. The indifference these chelating agents show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the chelating agents just mentioned may also be employed. Any of these types of chelating agent 10 may be selected for the examples disclosed herein, as long as the chelating agent 10 has a permanent dipole moment 11.

A list of some chelating agents 10 that may be used in the examples disclosed herein include:

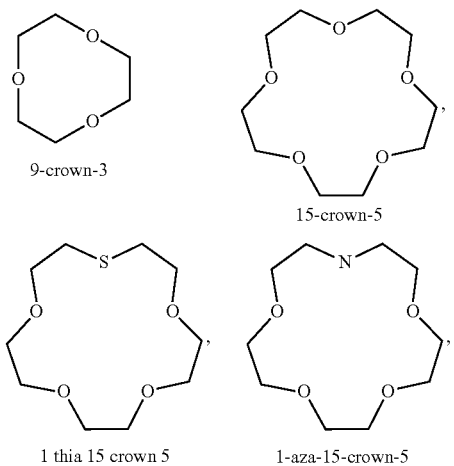

9-crown-3

15-crown-5

1 thia 15 crown 5

1-aza-15-crown-5

-continued

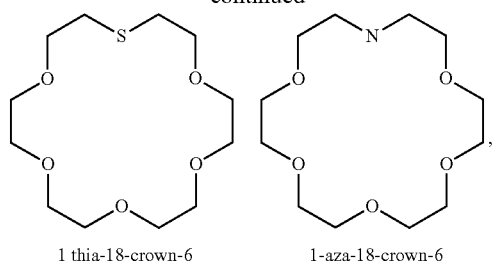

1 thia-18-crown-6     1-aza-18-crown-6

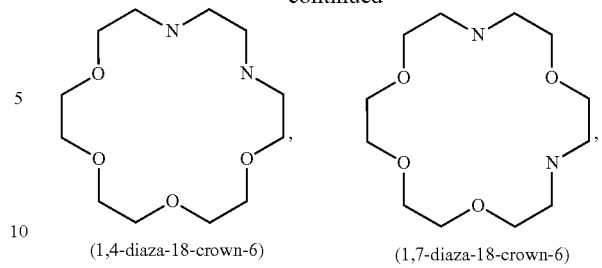

(1,4-diaza-18-crown-6)     (1,7-diaza-18-crown-6)

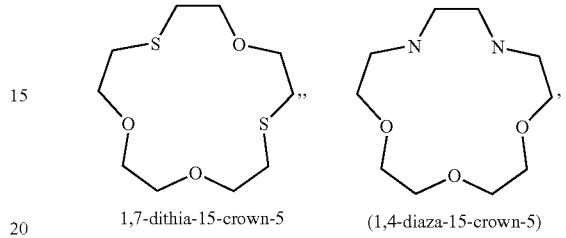

1,7-dithia-15-crown-5     (1,4-diaza-15-crown-5)

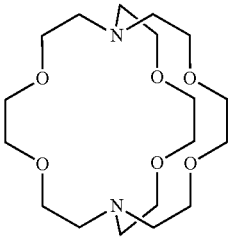

4,7,13,16,21,24-
hexanoxa-1,10-diaza-
bicyclo[8.8.8]hexacosane (i.e., [2.2.2]cryptand),

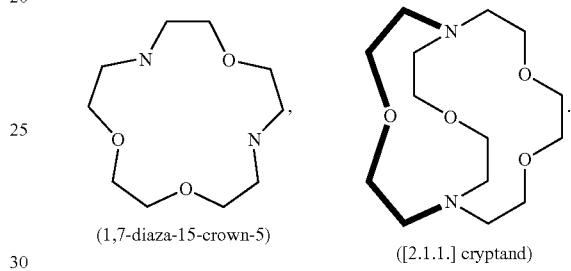

(1,7-diaza-15-crown-5)     ([2.1.1.] cryptand)

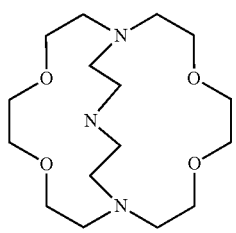

4,7,13,16-
tetraoxa-1,10,21-
triazabicyclo[8.8.5]tricosane (i.e., [2.2.1N]cryptand or aza[2.2.1]cryptand),

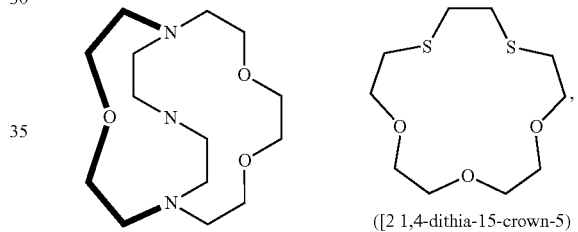

([2 1,4-dithia-15-crown-5])

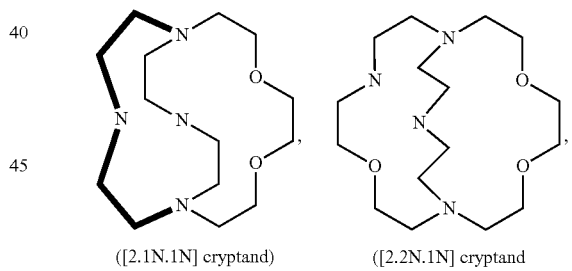

([2.1N.1N] cryptand)     ([2.2N.1N] cryptand

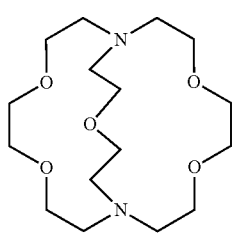

4,7,13,16,21-
pentaoxa-1,10,diaza-
bicyclo[8.8.5]tricosane (i.e., [2.2.1]cryptand),

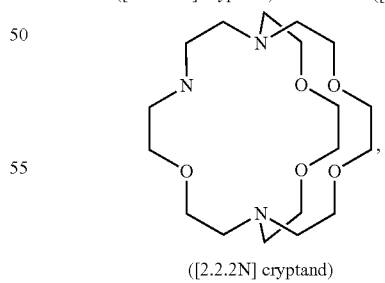

([2.2.2N] cryptand)

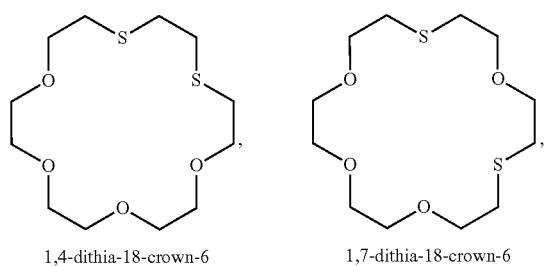

1,4-dithia-18-crown-6     1,7-dithia-18-crown-6 and combinations thereof. Any hydrogen atoms attached to carbon atoms in these structures are assumed.

As mentioned above, the chelating agent 10 is chemically bonded to a polymer backbone. The polymer backbone may include any suitable polymer, one example of which includes a polyolefin. A poly(1-olefin) may be prepared, for instance, from the Ziegler-Natta polymerization of functionally substituted polyolefins or by metathesis polymerization. The resultant poly(1-olefins) may then be functionalized with the chelating agent 10 to form the macrocyclic polymer. Some examples of the macrocyclic polymer include:

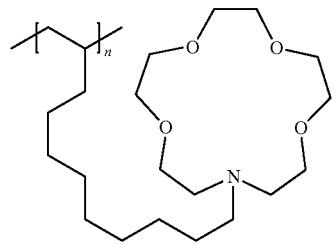

Polyundecylenylaza-15-crown-5,

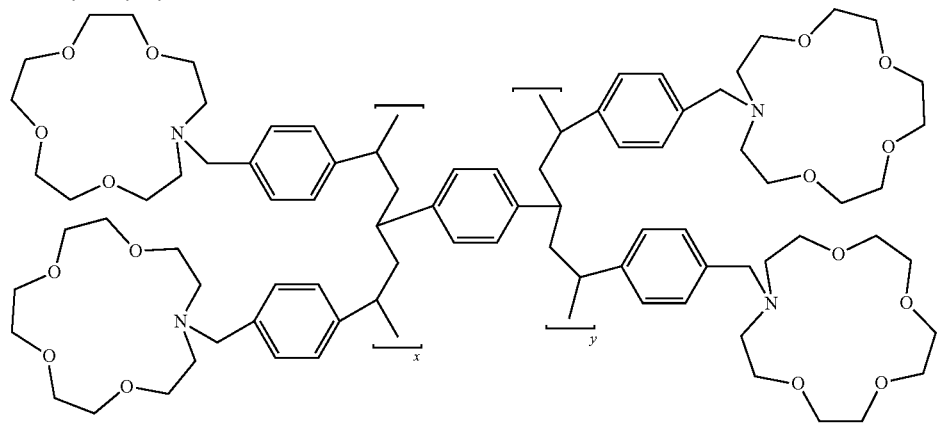

Poly(divinylbenzene-vinylbenzyl-aza-15-crown-5),

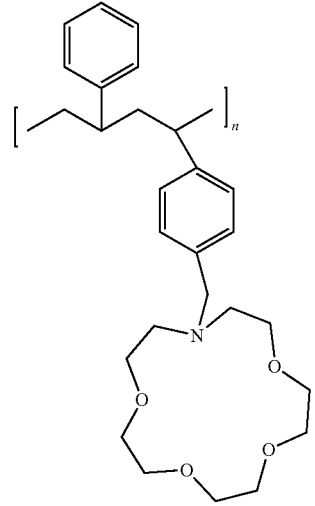

Poly(styrene-co-vinylbenzyl-aza-15-crown-5), and

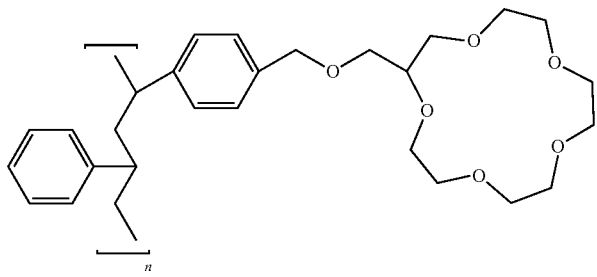

Poly(styrene-co-divinylbenzyl-oxymethyl-15-crown-5).

In the examples disclosed herein, the macrocycle functionalized polymers are used to form the separator, to coat a separator membrane, or to coat an electrode structure. During the manufacturing of the particular lithium ion battery component, an electrical poling field is applied in order to orient the permanent dipole moment 11 of the chelating agent 10 perpendicular to the plane of the particular lithium ion battery component. In the examples disclosed herein, the overall geometric form of the separator or the electrode structure is a very thin (<25 Lm thick) sheet. The thin sheet is evidently 2-dimensional (because its width is orders of magnitude larger than its thickness), and thus its geometric form is that of a plane.

Examples of the lithium ion battery components that can be formed by these processes are shown in FIGS. 2 through 5, and these figures may be referenced throughout the following discussion. Examples of the method are shown in FIGS. 6 through 12, and these figures may be references throughout the following discussion.

In one example of the method (see, e.g., FIG. 6), the macrocycle functionalized polymer (which is contained in a mixture with a high boiling point fluid alone or with another polymer) is co-extruded through a dual slot die of an extrusion nozzle. The dual slot die may be a rectangular or circular dual slot die. The co-extrusion forms two adjacent layers of the macrocycle functionalized polymer. These layers (e.g., 17, 17' in FIGS. 2 and 3 or 24, 24' in FIGS. 4 and 5) may form a separator (e.g., 16 shown in FIGS. 2 and 3) or a coating (e.g., 25 shown in FIGS. 4 and 5) for an electrode structure (e.g., 26 in FIGS. 4 and 5) or a coating for another microporous membrane (not shown). During the co-extrusion of the two layers of the mixture containing the macrocycle functionalized polymer, electrical poling fields are applied to the dual slot die. More particularly, two opposite direct current (DC) voltage differences, in the range of 10 V to 3,000 V, are applied to the dual slot die to achieve two electrical poling fields in opposite directions. One of the fields is applied to one of the layers being extruded, and the other of the fields is applied to the other of the layers being extruded so that the chelating agents 10, 10' are oriented with their respective dipole moments 11, 11' in opposite directions. It is to be understood, however, that the fields are applied so that all of the chelating agents 10, 10' in both of the layers are oriented perpendicular to the plane of the layers themselves.

As shown in FIG. 6, prior to performing the co-extrusion and dual poling (shown as reference numeral 32), process feed 28 is initiated and the macrocycle functionalized polymer is melted and mixed 30 with a solvent, and in some instances another polymer. After the co-extrusion and dual poling 32, the layers can be subjected to biaxial stretching 34, solvent extraction 36, annealing 38, and slitting and winding 40.

A triple nozzle may be used during extrusion in order to form a shut-down layer (e.g., polyethylene) between the two layers having their chelating agents 10, 10' poled in opposite directions.

A second example of the method is used to prepare a doubly-poled microporous membrane (e.g., the combination of 17 and 17' in FIGS. 2 and 3) for a separator 16 by a single extrusion process. This example of the method is shown in FIG. 7. In this example, the process feed 28 is initiated, and the macrocycle functionalized polymer is melted and mixed 30 with a solvent. At step 42, the macrocycle functionalized polymer is extruded through a slot die film in the presence of the applied electric field. In this example, the extruded film may be passed between two charged capacitor plates in order to apply the electric field while the polymer membrane cools down to room temperature. The voltage difference creating the electric field may range from about 10 V to about 3,000 V. This process orients the permanent dipole moments 11 of the chelating agents 10 in the microporous membrane in a direction perpendicular to the plane of the membrane. In this example, the membrane is then folded 44 over in a lengthwise direction so that two halves (e.g., 17 and 17') are in contact with one another, thus effectively producing two microporous membranes 17, 17', having their respective chelating agent permanent dipole moments 11, 11' (see FIGS. 2 and 3) oriented perpendicular to the plane P of the membranes 17, 17' but in opposite directions. The folded membrane may subsequently be laminated together 46 to form the separator 16.

FIG. 8 illustrates another example of the method involving a single extrusion process. In this example, the process feed 28 is initiated and the macrocycle functionalized polymer is melted and mixed 30 with a solvent (and in some instances another polymer). The macrocycle functionalized polymer-containing mixture is extruded 48 through a slot die of an extrusion nozzle, and then is exposed to biaxial stretching 34 and solvent extraction 36 (with or without poling taking place). The membrane is exposed to annealing in the presence of the applied electric field 38'. Annealing involves heating and then a cool-down step, and poling is inclusive in each of these steps. This process orients the permanent dipole moments 11 of the chelating agents 10 in the microporous membrane in a direction perpendicular to the plane of the membrane. In this example, the membrane is then folded 44 over in a lengthwise direction so that two halves (e.g., 17 and 17') are in contact with one another, thus effectively producing two microporous membranes 17, 17', having their respective chelating agent permanent dipole moments 11, 11' (see FIGS. 2 and 3) oriented perpendicular to the plane P of the membranes 17, 17' but in opposite directions. The folded membrane may subsequently be laminated 46 together to form the separator 16. Slitting and winding 40 may also be performed, as shown in FIG. 7. It is believed that folding 44 and laminating 46 may result in better alignment of the permanent dipole moments 11, 11'.

Yet another example of the method used to prepare a microporous membrane (e.g., 17 or 17' in FIGS. 2 and 3) for a separator 16 involves a solvent-cast process. In this example, the macrocycle functionalized polymer is solvent cast as a film in the presence of the applied electric field. In this example, the solvent cast film is passed between two capacitor plates in order to apply the electric field. The application of the electric field may be performed during evaporation of the solvent. The electric field may range from about 10 V to about 3000 V.

This process orients the permanent dipole moments 11 of the chelating agents 10 in the microporous membrane in a direction perpendicular to the plane of the film. The membrane is then folded over in a lengthwise direction so that two halves (e.g., 17 and 17') are in contact with one another, which effectively produces two microporous membranes 17, 17', having their respective chelating agent permanent dipole moments 11, 11' (see FIGS. 2 and 3) oriented perpendicular to the plane P of the membranes 17, 17' but in opposite directions. The folded membranes 17, 17' may subsequently be laminated together to form the separator 16. An example of the solvent casting method is shown in FIG. 9. In this example, poling may be performed either during casting (as discussed above and shown at reference numeral 50), or during a subsequent annealing step 38'. The method may also include solvent evaporation 52, biaxial stretching 34, annealing (with poling 38' or without poling 38), and slitting and winding 40.

Alternatively, two separate membranes 17, 17' may be formed using a solvent casting method. In this example, the electric field used for poling one of the membranes 17 may be in the opposite direction of the electric field used for poling the other of the membranes 17'. These membranes 17, 17' may be laminated together so that the chelating agent permanent dipole moments 11, 11' remain oriented perpendicular to the plane P of the membranes 17, 17' but in opposite directions.

Figure 2:
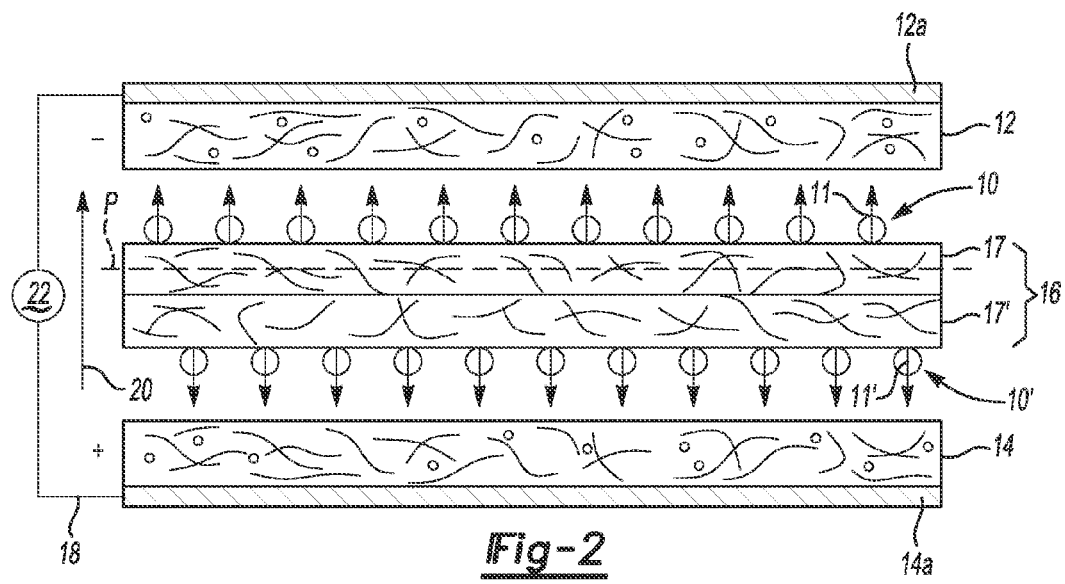
FIG. 2 is a semi-schematic cross-sectional view of a lithium ion battery including an example of a separator including chelating agents having oriented permanent dipole moments.
Figure 3:
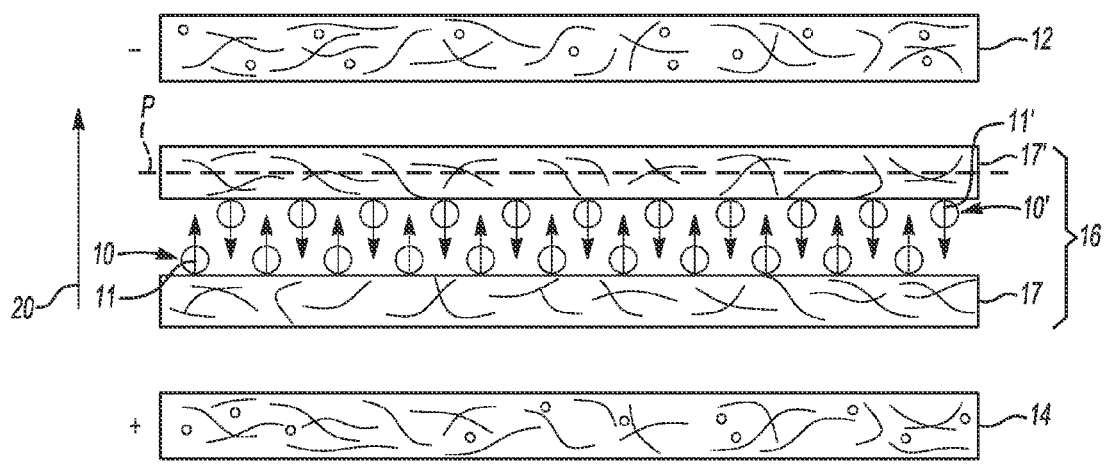
FIG. 3 is a semi-schematic cross-sectional view of another example of a lithium ion battery including another example of the separator including two separate layers, each of which includes chelating agents having oriented permanent dipole moments, where the separate layers are positioned with respect to one another so that their respective oriented permanent dipole moments are in opposite directions.

Examples of the resulting separator 16 are shown in FIGS. 2 and 3, with the membranes 17, 17' oriented with respect to one another such that the chelating agents 10, 10' face away from one another (FIG. 2) or towards each other (FIG. 3) so that the permanent dipole moments 11, 11' are opposite one another. In these examples, the polymer macrocycle itself forms the separator 16.

In another example that is similar to the one just described, the macrocycle functionalized polymer is mixed with a solvent and another polymer which acts as a binder (with the macrocyclic polymer and the binder polymer in mass ratios ranging from 4:1 to 98:2), and then is applied to a previously formed microporous membrane. As such, the macrocycle functionalized polymer forms a coating on another microporous membrane. In other words, the macrocycle functionalized polymer may form a coating on any pre-existing membrane.

Examples of this microporous membrane include a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured microporous films of PE and/or PP. Commercially available polyolefin microporous polymer separators 16 include CELGARD® 2500 (a monolayer polypropylene separator) and CELGARD® 2320 (a trilayer polypropylene/polyethylene/polypropylene separator) available from Celgard LLC.

In another example, the microporous membrane may be formed from another polymer chosen from expanded polytetrafluoroethylene (ePTFE), polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane is poly(p-hydroxybenzoic acid). In yet another example, the membrane may be a combination of one of these polymers and a polyolefin (such as PE and/or PP). Some other commercially available separators are available from Entek International, Asahi-Kasei Corporation, Toray Industries, and SK Energy.

The microporous membrane may contain a single layer or a multi-layer laminate fabricated by either a dry or wet process, by solvent casting, by a non-woven fiber laying process, or by any other process for making a microporous polymer membrane with properties suitable for application in Li-ion batteries. For example, in one example, a single layer of the polyolefin may constitute the entirety of the microporous membrane. In another example, a single layer of one or a combination of any of the polymers from which the microporous membrane may be formed (e.g., the polyolefin and/or one or more of the other polymers listed above for the microporous membrane) may constitute the entirety of the microporous membrane. As another example, however, multiple discrete layers of similar or dissimilar polyolefins and/or polymers for the microporous membrane may be assembled into the microporous membrane.

After the solvent, binder, and macrocycle functionalized polymer containing mixture is applied to the microporous membrane, the coated microporous membrane may be passed between two capacitor plates in order to apply the electric field and orient the permanent dipole moments of the macrocycle functionalized polymer coating in one direction. The coated membrane is then folded over in a lengthwise direction, thus effectively producing two microporous membranes 17, 17', having their respective chelating agent permanent dipole moments 11, 11' (see FIGS. 2 and 3) oriented perpendicular to the plane P of the membranes 17, 17' but in opposite directions. The folded, coated membrane may subsequently be laminated together to form the separator 16.

In another example, instead of folding the coated membrane in half, a second coated membrane may be formed. In some examples, another electric field is used to form a separate second coated membrane, where this other electric field has a direction opposite to the field used to create the first coated membrane. These separate membranes may then be laminated together so that the dipoles in the coated layers are perpendicular to the sheets and point in opposite directions. In other examples, the first coated membrane (with all the dipole moments aligned in the same direction) may be split into two membranes, which are wound onto separate spools. From the two spools, the two membranes may then be assembled to form the poled sheets which have the dipoles in opposite directions, and laminated.

Another example of the method (shown in FIG. 10) uses coating with poling. In this example, the process feed 28 is initiated, and the macrocycle functionalized polymer is coated onto a pre-existing separator in the presence of the applied electric field 54. The coated separator is then folded 44 and laminated 46 to create the two sets of chelating agents oriented perpendicular to the plane and in opposite directions with respect to one another. This example of the method may also involve winding 56.

Figure 11:
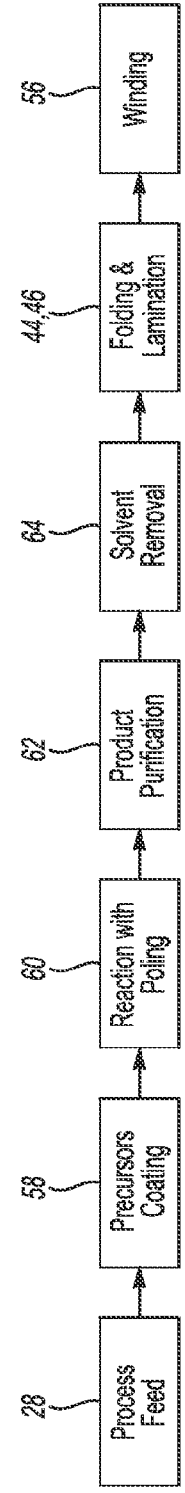
Figure 12:
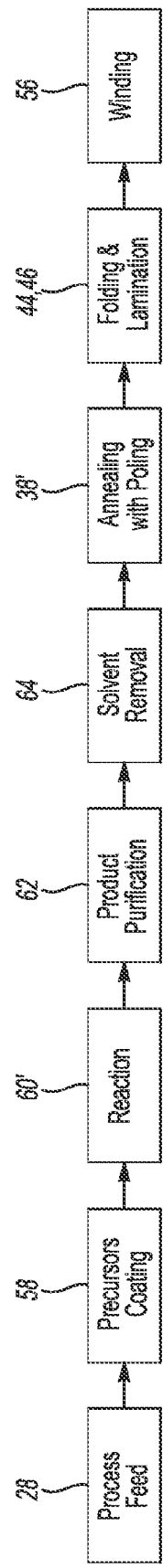

Still another example of the method may be used to form a microporous membrane 17, 17' in FIGS. 2 and 3 for a separator 16. In this example, the chelating agent 10 is actually attached to the polymer backbone via a chemical reaction during the process. Examples of this method are shown in FIGS. 11 and 12, where chelating agent precursors are mixed with polymer backbone precursors, and this precursor mixture is coated 58. A chemical reaction between the precursors attaches the chelating agent to the polymer backbone. In the example of FIG. 11, the chemical reaction takes place in the presence of the electric field 60, and in FIG. 12, the chemical reaction 60' takes place without the electric field, and the electric field is applied during a subsequent annealing step 38'. In either example, the created membrane has its chelating agents oriented perpendicular to the plane of the membrane. This membrane is then folded 44 over in a lengthwise direction, thus effectively producing two microporous membranes 17, 17', having their respective chelating agent permanent dipole moments 11, 11' (see FIGS. 2 and 3) oriented perpendicular to the plane P of the membranes 17, 17' but in opposite directions. The folded membrane may subsequently be laminated 46 together to form the separator 16. Any solvent removal 64 and membrane purification 62 steps (to remove unreacted precursors or intermediates) may be performed either before or after the fold-over 44 and lamination step 66. Either of the examples methods shown in FIGS. 11 and 12 may also include winding 56.

In a similar example, the chelating agent 10, 10' may be attached to the polymer backbone via a chemical reaction in the presence of the electric field to form a coating component (e.g., particles). These coating components can be deposited onto a previously formed microporous membrane to form a coated membrane. The coated membrane with chelating agents oriented perpendicular to its plane is then folded over in a lengthwise direction, thus effectively producing two microporous membranes 17, 17', having their respective chelating agent permanent dipole moments 11, 11' (see FIGS.

2 and 3) oriented perpendicular to the plane P of the membranes 17, 17' but in opposite directions. This folded, coated membrane may subsequently be laminated together to form the separator 16. Any solvent removal and membrane purification steps (to remove unreacted precursors or intermediates) may be performed either before or after the fold-over and lamination step. Polymers amenable to orientation in an electric field include those with tethered groups having dipole moments and those with ionic groups. Polymers that soften when heated allow dipole orientations which are locked in place as the polymer hardens. Especially desirable polymers are those that soften i) above the battery service temperature (>45° C.) so that fixed dipoles are not realigned during use, or ii) above temperatures used for drying the battery or its components during battery manufacture (>100° C.). Useful polymers include those with vinylbenzyl-aza-15-crown-5 crosslinked with divinylbenzene, and semi-crystalline polymers with tethered aza-15-crown-5:

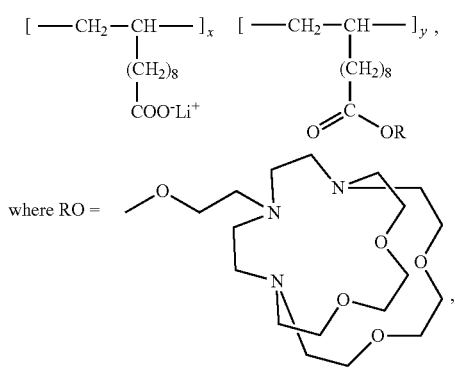

where RO =

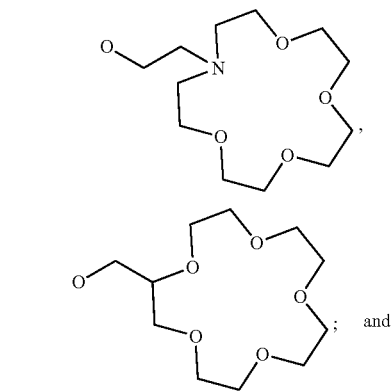

; and

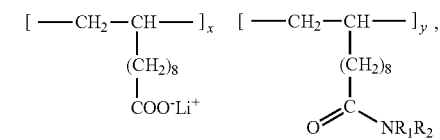

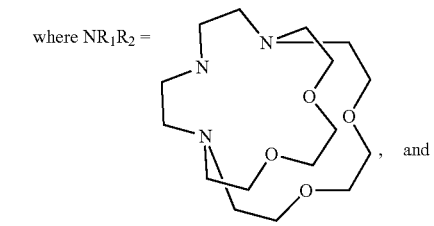

where $NR_1R_2$ =

, and

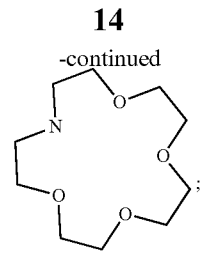

;

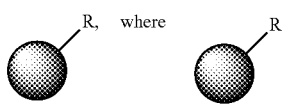

represents a cross-linked polymer bead and R=

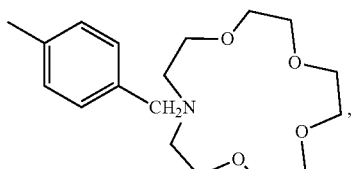

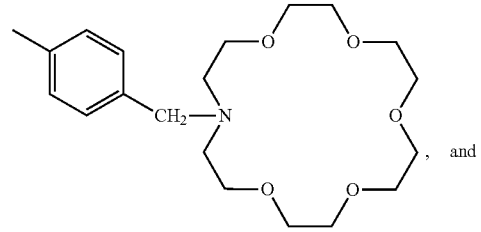

and the like.

Another example of the method is used to prepare a film (e.g., 24 or 24' in FIGS. 4 and 5) for an electrode structure 26. In this example, the macrocycle functionalized polymer is solvent cast as the film in the presence of the applied electric field having a first direction. In an example, the solvent cast film is passed between two capacitor plates in order to apply the electric field. The application of the electric field may be performed during evaporation of the solvent. The electric field may range from about 10 V to about 3000 V. This process orients the permanent dipole moments 11 of the chelating agents 10 in the film in the first direction. This example of the method may be repeated (except that the applied electric field has a direction opposite to that of the first direction) in order to form a second film having its chelating agent permanent dipole moments 11 oriented in a second direction that is opposite to the first direction. The two films 24, 24', having their respective chelating agent permanent dipole moments 11, 11' (see FIGS. 4 and 5) oriented perpendicular to the plane of the underlying electrode structure 26 but in opposite directions, may be laminated together to form a coating 25, 25'.

The laminated coating 25, 25' may then be applied to an electrode structure 26 that is suitable for use as the positive electrode 14', 14" in a lithium ion battery. The electrode structure 26 includes a lithium transition metal based active material, an electronically conductive carbon, and a binder.

It is to be understood that any lithium transition metal based active material that can sufficiently undergo lithium intercalation and deintercalation while functioning in the positive electrode of a lithium ion battery may be used. Examples of the active material include at least one of spinel lithium manganese oxide ($LiMn_2O_4$), lithium cobalt oxide ($LiCoO_2$), a manganese-nickel oxide spinel [$Li(Mn_{1.5}Ni_{0.5})O_2$], a layered nickel-manganese-cobalt oxide [$Li(Ni_{1-x}Mn_{1-y}Co_{x+y})O_2$], $LiNiO_2$, $Li_2MSiO_4$ (M=any ratio of Co, Fe, and/or Mn), a lithium iron polyanion oxide, such as lithium iron phosphate ($LiFePO_4$) or lithium iron fluorophosphate ($Li_2FePO_4F$), $Li_2SiO_4$, or a lithium rich layered-structure cathode, such as $xLi_2MnO_3\text{-}(1\text{-}x)LiMO_2$ (M is composed of any ratio of Ni, Mn and/or Co). Other lithium-based active materials may also be utilized besides those just mentioned. Examples of those alternative materials include $LiNi_{1-x}Co_{1-y}M_{x+y}O_2$, $LiMn_{1.5-x}Ni_{0.5-y}M_{x+y}O_4$, (M is composed of any ratio of Al, Co, Ti, Cr, and/or Mg), stabilized lithium manganese oxide spinel ($Li_xMn_{2-y}M_yO_4$, where M is composed of any ratio of Al, Ti, Cr, and/or Mg), and lithium vanadium oxide ($LiV_2O_5$), and any other high energy nickel-manganese-cobalt material (HE-NMC). By "any ratio" it is meant that any element may be present in any amount. So, for example M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The conductive carbon of the structure 26 may be any high surface area carbon, such as acetylene black, that intermingles with the lithium transition metal based active material. "High surface area carbon" as used herein is meant to include any carbon having a BET (=Brunauer-Emmett-Teller) surface area ranging from 50 to 2,000 $m^2/g$. The conductive carbon may be added to ensure electron conduction between a current collector of the lithium ion battery and the active material particles of the positive electrode 14', 14".

The binder of the structure 26 may be any polymeric binder that is capable of structurally holding the lithium-based active material together. Examples of the binder include polyvinylidene fluoride (PVdF), an ethylene propylene diene monomer (EPDM) rubber, carboxymethyl cellulose (CMC), and/or a lithium salt of polyacrylic acid.

Figure 4:
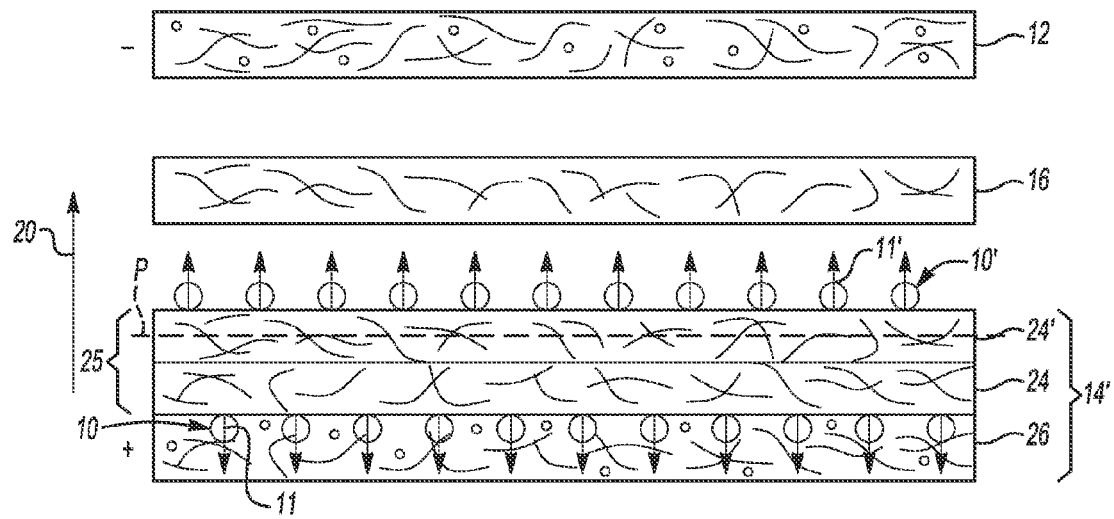
FIG. 4 is a semi-schematic cross-sectional view of still another example of a lithium ion battery including an example of a positive electrode including a coating with the chelating agents having oriented permanent dipole moments.
Figure 5:
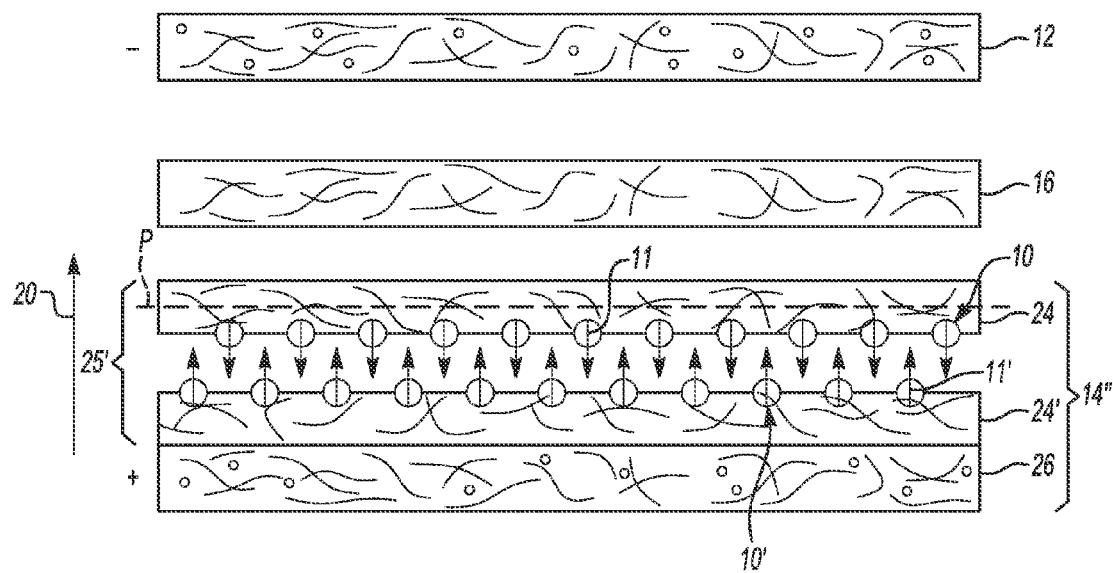
FIG. 5 is a semi-schematic cross-sectional view of yet another example of a lithium ion battery including an example of a positive electrode including a coating formed from two films, each of which includes chelating agents having oriented permanent dipole moments, where the films are positioned with respect to one another so that their respective oriented permanent dipole moments are in opposite directions.
Figure 10:
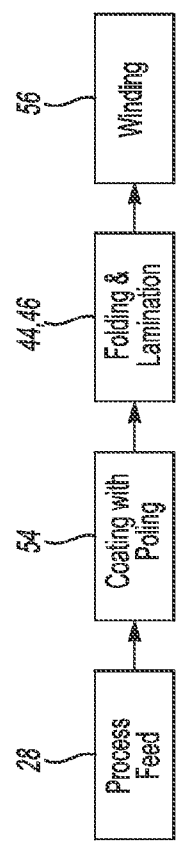

Examples of the coated positive electrodes 14', 14" are shown in FIGS. 4 and 5, with the chelating agents 10, 10' of the respective films 24, 24' directed away from one another in the coating 25 (FIG. 4) or towards each other in the coating 25' (FIG. 5) so that the permanent dipole moments 11, 11' are opposite one another.

In another example of the method, the chelating agent 10 may be attached to the polymer backbone via a chemical reaction in the presence of the electric field to form a coating component (e.g., particles). Two layers of these coating components (having their respective chelating agent permanent dipole moments 11, 11' oriented perpendicular with respect to the plane of the electrode structure 26 and in opposite directions) can be created by the lengthwise fold-over and lamination method previously described, or by taking two separate sheets coated with an oriented polymeric macrocycle and laminating them together in such a fashion that the dipoles in the two layers point in opposite directions perpendicular to the plane of the membrane.

The macrocycle functionalized polymer may also be used in a phase separation process to form the lithium ion battery component. In general, the electric field may be applied during the solvent evaporation step, or during any annealing step subsequent to the uniaxial or biaxial stretching, or during the solvent extraction step of the membrane production process. In these examples, folding and lamination may be used to generate the dual-poled macrocyle functionalized membrane.

In one example, a mixture of the solid macrocycle functionalized polymer and a liquid component is formed. The liquid component is volatile above some temperature. The evaporation of the liquid from the mixture is an example of the phase separation (the solid matrix and the solvent vapor are the two phases), and will leave behind a microporous structure which may be used as the membranes 17, 17', as the films 24, 24', or as coatings on a previously formed microporous membrane. During the evaporation, the mixture may be passed between capacitor plates in order to apply the electric field and orient the permanent dipole moments 11 or 11' of the chelating agents 10 or 10'. In an example, the formed membrane with chelating agents oriented perpendicular to its plane is then folded over in a lengthwise direction, thus effectively producing two microporous membranes 17, 17', having their respective chelating agent permanent dipole moments 11, 11' (see FIGS. 2 and 3) oriented perpendicular to the plane P of the membranes 17, 17' but in opposite directions. Subsequent lamination may be used to form the separator 16.

In another example, a high boiling point liquid (e.g., decane, dodecane, hexadecane, mineral oil) and the solid macrocycle functionalized polymer, which are immiscible, are intimately mixed at room temperature. The mixture is then heated above the melting point of the macrocycle functionalized polymer and is thoroughly mixed, after which a sheet is extruded and then cooled. The resulting material is phase separated into a solid and a liquid (e.g., a sponge-like solid structure with open pores that are filled with a liquid). The liquid-filled sheet is then stretched in one or two (orthogonal) directions, to make the sheet thinner, and then the solvent is extracted using a volatile chlorinated solvent. During the solvent extraction, the sheet may be passed between capacitor plates in order to apply the electric field and orient the permanent dipole moments 11 or 11' of the chelating agents 10 or 10'. Furthermore, an electric field may also be applied during the stretching, as well as during any annealing steps subsequent to the stretching or extraction steps of the membrane fabrication process. The created membrane with chelating agents oriented perpendicular to its plane is then folded over in a lengthwise direction, thus effectively producing two microporous membranes having their respective chelating agent permanent dipole moments 11, 11' oriented perpendicular to the plane P of the membranes but in opposite directions. Subsequent lamination may be used to form the separator 16 or coating 25. Any solvent removal and membrane purification steps (to remove unreacted precursors or intermediates) may be performed either before or after the fold-over and lamination step.

Referring now specifically to FIG. 2, an example of the lithium ion battery is depicted with the components slightly separated from one another so that the oriented permanent dipole moments 11, 11' are visible.

The lithium ion battery includes the separator 16 disposed between a negative electrode 12 and a positive electrode 14. As discussed above, the separator 16 is made of two assembled macrocycle polymer membranes 17, 17' having the permanent dipole moments 11, 11' of the respective chelating agents 10, 10' oriented perpendicular to the plane P of the membranes 17, 17' and in opposite directions with respect to one another. The separator 16, which operates as both an electrical insulator and a mechanical support, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions and related anions through an electrolyte solution filling its pores. The chelating agents 10, 10' present in the separator 16 also effectively trap and immobilize the unwanted transition metal cations (e.g., $Mn^2$) to prevent the migration of these metal cations through the electrolyte solution and to the negative electrode 12.

The permanent dipole moments 11, 11' of the chelating agents 10, 10' of the respective membranes 17, 17' are perpendicular with respect to the plane P of the membranes 17, 17'. The permanent dipole moments 11, 11' are also in opposite directions with respect to one another. As illustrated in FIG. 2, the permanent dipole moments 11 are parallel with respect to an internal electric field (E field) 20 of the lithium ion battery, and the permanent dipole moments 11 are anti-parallel with respect to the internal E field 20 of the lithium ion battery. In an example, it may be desirable that the distribution of parallel and anti-parallel permanent dipole moments 11, 11' be 50/50. A 50/50 distribution is deemed most advantageous because the chelating agents must trap the transition metal cations irrespective of the direction of the electric current inside the battery, i.e., both during the charging and the discharging of the battery.

The negative electrode 12 may include any lithium host active material that can sufficiently undergo lithium intercalation and deintercalation while functioning as the negative terminal of the lithium ion battery. Examples of the lithium host active material include graphite or a low surface area amorphous carbon. Graphite is widely utilized to form the negative electrode 12 because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate, silicon or silicon-carbon composites, and tin oxide.

The negative electrode 12 may also include a polymer binder material intermingled with the lithium host active material to structurally hold the lithium host active material together. Examples of the binder include polyvinylidene fluoride (PVdF), an ethylene propylene diene monomer (EPDM) rubber, or carboxymethyl cellulose (CMC). These materials (i.e., the lithium host active material and the binder) may be mixed with a high surface area carbon, such as acetylene black, to ensure electron conduction between a current collector (shown as 12a in FIG. 2) and the active material particles of the negative electrode 12. The negative-side current collector 12a may be formed from copper or any other appropriate electrically conductive material known to skilled artisans.

The positive electrode 14 in this example of the lithium ion battery is similar to structure 25 previously described herein. In short, the positive electrode 14 may include any of the lithium transition metal based active materials, conductive carbons, and binders previously described.

Adjacent to the positive electrode 14 is a positive-side current collector 14a, which may be formed from aluminum or any other appropriate electrically conductive material known to skilled artisans.

The negative-side current collector 12a and the positive-side current collector 14a may be positioned in contact with the negative electrode 12 and the positive electrode 14, respectively, to collect and move free electrons to and from an interruptible external circuit 18, which connects the negative electrode 12 and the positive electrode 14.

Each of the negative electrode 12, the positive electrode 14, and the microporous separator 16 are soaked in an electrolyte solution. It is to be understood that any appropriate electrolyte solution that can conduct lithium ions between the negative electrode 12 and the positive electrode 14 may be used in the lithium ion battery. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(CF_3SO_2)_2$(LiTFSI), $LiN(FSO_2)$, (LiFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, tiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Other electrolytes may be used instead of the electrolyte solution. As examples, polymer electrolytes, ionic liquids, melt electrolytes, or the like may be used. Some specific examples of ionic liquids include 1-ethyl-3-methylimidazolium bis(fluorosulfonyl)imide, 1-ethyl-3-methylimidazolium bis(trifluoromethane sulfonyl)imide, phosphonium bis(trifluoromethane sulfonyl)imide, phosphonium bis(fluorosulfonyl)imide, triethyl(methoxymethyl)phosphonium bis(trifluoromethylsulfonyl)imide, triethyl(2-methoxyethyl) phosphonium, and bis(trifluoromethylsulfonyl)imide. Some examples of melt electrolytes include lithium bis(fluorosulfonyl)imide in dimethylmethanesulfonamide and lithium bis (trifluoromethane sulfonyl)imide in dimethylmethanesulfonamide. While some examples have been given herein, it is to be understood that other polymer electrolytes, ionic liquids, and melt electrolytes could be used.

The lithium ion battery may support a load device 22 that can be operatively connected to the external circuit 18, which connects the negative electrode 12 and positive electrode 14. The load device 22 receives a feed of electrical energy from the electric current passing through the external circuit 18 when the lithium ion battery is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be an electrical power-generating apparatus that charges the lithium ion battery for purposes of storing energy. For instance, the tendency of windmills and solar panels to variably and/or intermittently generate electricity often results in a need to store surplus energy for later use.

The lithium ion battery may also include a wide range of other components that, while not depicted here, are nonetheless known to skilled artisans. For instance, the lithium ion battery may include a casing, gaskets, terminals, tabs, and any other desirable components or materials that may be situated between or around the negative electrode 12 and the positive electrode 14 for performance-related or other practical purposes. Moreover, the size and shape of the lithium ion battery, as well as the design and chemical make-up of its main components, may vary depending on the particular application for which it is designed. Battery-powered automobiles and hand-held consumer electronic devices, for example, are two instances where the lithium ion battery would most likely be designed to different size, capacity, and power-output specifications. The lithium ion battery, or a plurality of lithium ion batteries, may also be connected in series and/or in parallel with other similar lithium ion batteries to produce a greater voltage output and current (if arranged in parallel) or voltage (if arranged in series) if the load device 22 so requires.

The lithium ion battery generally operates by reversibly passing lithium ions between the negative electrode 12 and the positive electrode 14. In the fully charged state, the voltage of the battery is at a maximum (typically in the range 2.0V to 5.0V); while in the fully discharged state, the voltage of the battery is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery contains a high concentration of intercalated lithium while the positive electrode 14 is relatively depleted. When the negative electrode 12 contains a sufficiently higher relative quantity of intercalated lithium, the lithium ion battery can generate a beneficial electric current by way of reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 14 and the negative electrode 12 (ranging from about 2.0V to about 5.0V, depending on the exact chemical make-up of the electrodes 14, 12) drives the electrons ($e^-$) produced by the oxidation of intercalated lithium at the negative electrode 12 through the external circuit 18 towards the positive electrode 14. The lithium ions, which are also produced at the negative electrode 12, are concurrently carried by the electrolyte solution through the separator 16 towards the positive electrode 14. The electrons (e) flowing through the external circuit 18 and the lithium ions migrating across the separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery can be charged or re-powered at any time after a partial or full discharge of its available capacity by applying an external battery charger to the lithium ion battery to reverse the electrochemical reactions that occur during battery discharge. The connection of an external power source to the lithium ion battery compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery may vary depending on the size, construction, and particular end-use of the lithium ion battery. Some suitable external battery chargers include a battery charger plugged into an AC wall outlet and a motor vehicle alternator.

FIG. 3 is similar to FIG. 2, except that some of the battery components are not shown, and the separator 16 has the oriented chelating agents 10, 10' facing one another, rather than facing outward (like the example shown in FIG. 2). Any of the lithium ion battery components of FIG. 2 may be used in FIG. 3.

Referring now specifically to FIG. 4, some of the components of the lithium ion battery are depicted. The lithium ion battery includes a separator 16 (such as a previously formed separator as opposed to one made up of the membranes 17, 17') disposed between a negative electrode 12 and a positive electrode 14'. The separator 16, which operates as both an electrical insulator and a mechanical support, is sandwiched between the negative electrode 12 and the positive electrode 14' to prevent physical contact between the two electrodes 12, 14' and the occurrence of a short circuit. The separator 16, in addition to providing a physical barrier between the two electrodes 12, 14, ensures passage of lithium ions and related anions through an electrolyte solution filling its pores.

As discussed above, the positive electrode 14' includes the electrode structure 26 and two assembled films 24, 24' that form the coating 25 on the electrode structure surface. This coating 25 faces the separator 16. The two assembled films 24, 24' have the permanent dipole moments 11, 11' of the respective chelating agents 10, 10' oriented perpendicular to the plane P of the electrode structure 26 and in opposite directions with respect to one another. The chelating agents 10, 10' present in the two assembled films 24, 24' also effectively trap and immobilize the unwanted metal cations (e.g., $Mn^{2+}$) to prevent the migration of these metal cations through the electrolyte solution and to the negative electrode 12.

The permanent dipole moments 11, 11' of the chelating agents 10, 10' of the two assembled films 24, 24' are perpendicular with respect to the plane P of the electrode structure 26. The permanent dipole moments 11, 11' are also in opposite directions with respect to one another. As illustrated in FIG. 4, the permanent dipole moments 11 are parallel with respect to an internal E field 20 of the lithium ion battery, and the permanent dipole moments 11 are anti-parallel with respect to the internal E field 20 of the lithium ion battery. In an example, it may be desirable that the distribution of parallel and anti-parallel permanent dipole moments 11, 11' be 50/50.

FIG. 5 is similar to FIG. 4, except that the electrode 14" has the oriented chelating agents 10, 10' facing one another, rather than facing outward (like the example shown in FIG. 4), but the permanent dipole moments 11, 11' are still in opposite directions. Any of the lithium ion battery components of FIG. 2 may be used in FIGS. 4 and 5.

To further illustrate the present disclosure, examples are given herein. It is to be understood that these examples are provided for illustrative purposes and are not to be construed as limiting the scope of the present disclosure.

EXAMPLES

Electrostatic Printing of Particulate Polymer-Bound, Chelating Agents

The chelating particles (2.5 parts by weight) were admixed with 97.5 parts by weight of a triboelectric charge forming carrier comprised of a steel (ferrite) core coated thereover with a polymer mixture containing 70 percent by weight of Kynar (polyvinylidene fluoride) blended with 30 percent by weight of polymethyl methacrylate: the carrier coating weight being about 0.9 percent. [Alternatively, a commercial Xerox 1075® ferrite carrier (about 350 micrometers in diameter) can be used.] A positive triboelectric charging of the chelating particles results. Solid area coatings of the particulate chelates were then made using a capacitor consisting of two aluminum plates separated by 4 millimeters and charged at between 500 and 1,200 volts D.C. Commercial polyethylene or polypropylene separators were taped to the negatively-charged aluminum capacitor plate. An electrostatic coating of the chelating particles was then made by cascading the admixture of particulate chelating agents and carrier, over the separator sheet until a particulate coating mass of about 1.1 to 2.0 milligrams per cm² was achieved. A desired coating mass was about 1.79 milligrams per cm². Attachment of the particles to the separator sheet was then carried out using a Viton® or silicone hot roll fuser operated at 3.3 inches per second or by using a heated plate, flash, radiant, or cold pressure fix hardware, with the presence of an electric field to pole the treated battery separator sheets.

To improve adhesion of the particulates to the separator sheet, a binder of adhesive polymer is sometimes used. Binders, such as poly(4-phenyl-1-butene) or other semi-crystalline polyolefins (e.g., polyhexene, polypentene, etc.) are added as particulates to the chelating particles before the electrostatic printing process or are solution sprayed to fix the particles coated on the commercial separator sheet.

Preparation of Poly[(56.1-Mol % Vinylbenzylaza-15-Crown-5)-(43.9-Mol % Divinylbenzene)]

Freshly distilled THF (25 mL), aza-15-crown-5 (2.278 g, 10.4 mmol, IBC) and 100-nm particles of poly[(60-wt. % chloromethylstyrene)-(40-wt. % divinylbenzene)](1.2 g, 4.721 mmol of chloromethyl groups) suspended in freshly distilled THF (25 mL) that had been dispersed using an IKA Turrax t-25 homogenizer were added to a 100-mL screw-cap jar with a Teflon-lined lid. The lid on the jar was secured and the mixture was roll-milled for 2 weeks. A solution of aqueous lithium hydroxide (1 g in 10 g of water) was then added and the THF was allowed to evaporate. The mixture was centrifuged and the water layer was decanted off from the sediment. The solids were washed twice with freshly distilled THF (25 mL) followed by re-suspension and then centrifugation. The solids were then air dried to yield 1.8 grams of solids. A portion of the sediment (0.12 g) suspended in 25 mL of freshly distilled THF with an IKA Turrax t-25 homogenizer was filtered onto a commercial separator (0.09 g) and air-dried to produce a lithium ion battery separator. Three separators were made, and one of the separators was heated at 80° C. in the presence of an electric field at 500 V D.C.

Battery Separator Made with Poly(Lithium Undecylenate-N-Aza-15-Crown-5-Undecylenyl Amide) and a Commerical Polyolefin Separator Poly(lithium undecylenate-N-aza-15-crown-5-undecylenyl amide),

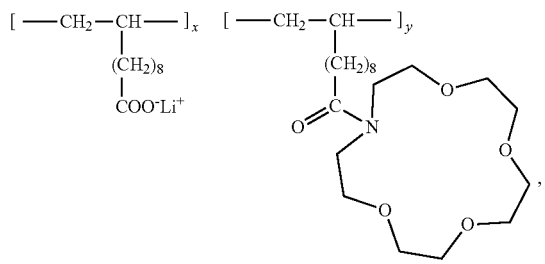

(1 g) and lithium chloride (1 g) were suspended in a 1:1 mixture of propanol and water (20 mL) using an IKA Turrax t25 homogenizer. A 3-mil Bird applicator with masking tape used as a shim was used to apply a wet film of the dispersion onto a two-sided TFE-coated Kapton film (American Durofilm) used as a backer sheet. A commercial polyolefin separator was stretched on an embroidery frame and laid on top of the wet film, and the solution imbided into the separator. An optional second coating of the dispersion was then applied on top of this composite using a 3-mil Bird applicator with masking tape used as a shim. After heating at 80° C. until dry with an applied field of 1000 V D.C. on a heated platen, the film was removed from the backer to produce a free standing film which was rendered microporous by soaking in de-ionized water for 16 hours. The microporous poly(lithium undecylenate-N-aza-15-crown-5-undecylenyl amide) with ePTFE composite film was used as a battery separator in lithium ion batteries.

Battery Separator Made with Poly(Lithium Undecylenate-N-Aza-15-Crown-5-Undecylenyl Amide)

Poly(lithium undecylenate-N-aza-15-crown-5-undecylenyl amide) (1 g) and lithium chloride (1 g) were suspended in a 1:1 mixture of propanol and water (20 mL) using an IKA Turrax t25 homogenizer. A 3-mil Bird applicator with two masking tape spacers used as shims was used to apply a wet film of the dispersion onto a two-sided TFE-coated Kapton film (American Durofilm) used as a backer sheet. After drying at 80° C. on a heated platen, another layer of two-side TFE-coated Kapton was laid on top of the dried film and the sandwich was compression molded between two polished, 5-inch by 5-inch steel plates at 150° C. and 2000 pounds pressure for 5 minutes with an applied filed of 1000 V D.C. After cooling, the poly(lithium undecylenate-N-aza-15-crown-5-undecylenyl amide) film was removed from the release film and was floated in water for 16 hours to make a microporous film used as a battery separator in lithium ion batteries. The film can be optionally compression molded in the presence of an electric field to orient the carboxylate groups in a semicrystalline matrix.

Preparation of Solution Coated Polymer Bound Chelates in the Presence of an Electric Field In a hood, a Kapton film was laid on the platen of an Erichsen coater and then a thin aluminum vacuum plate was placed on top. A sheet of a commercial polyolefin separator was taped to the vacuum plate and a 1 wt. % coating of metal chelate particles suspended in 1-propanol was wet laid onto the commercial polyolefin separator using a 3-mil Bird applicator. Then, 4-mm shims of insulating Kapton tape were used to separate the first aluminum plate with the composite coating from that of a second aluminum plate situated over the first plate. The aluminum plates were then connected to a power supply and 1000 V D.C. was applied. Meanwhile, a fan was used to blow propanol fumes from this make-shift capacitor while the platen was heated to 80° C. over 15 minutes. After 30 minutes at 80° C., the commercial polyolefin separator coated with electric field oriented particulate metal chelates was used as a battery separator in a lithium ion battery.

Electrostatic Printing of Particulate Poly(Lithium Undecylenate with Chelating Agents), Such as Poly(Lithium Undecylenate-N-Aza-15-Crown-5-Undecylenyl Amide)

Particles of poly(lithium undecylenate with chelating agents) or poly(undecylenic acid with chelating agents) were formed by extrusion at 140° C. followed by grinding and air jet milling with a Trost Gem T attritor, followed by sieving through fine, 350 mesh screens, to produce 8 to 10-micron particles suitable for electrostatic printing.

Alternatively, particles were formed by co-extrusion with poly(2-ethyl-2-oxazoline), respectively, at 30,000, 50,000 or 250,000 molecular weight, depending on the size or shape of the desired spherical particles. The extrudate was chopped, suspended in water and then some methanol was added to prevent foaming. The solid chelating agent particles were isolated by filtration, washed with water and then with methanol. Then the particles were dried and sieved to produce fibers or 10-micron, 2-micron, and 100-nm particles, depending on the molecular weight of the poly(2-ethyl-2-oxazoline). Smaller particle dimensions were formed by increasing the molecular weight of the poly(2-ethyl-2-oxazoline).

The chelating particles (2.5 parts by weight) of this example were admixed with 97.5 parts by weight of a triboelectric charge forming carrier comprised of a steel (ferrite) core coated thereover with a polymer mixture containing 70 percent by weight of Kynar (polyvinylidene fluoride) blended with 30 percent by weight of polymethyl methacrylate; the carrier coating weight being about 0.9 percent. (Alternatively, a commercial Xerox 1075® ferrite carrier (about 350 micrometers in diameter) can be used.) A positive triboelectric charging of the chelating particles results.

Solid area coatings of the particulate chelates were then made using a capacitor consisting of two aluminum plates separated by 4 millimeters and charged at between 500 and 1,200 volts D.C. Commercial polyolefin separators were taped to the negatively-charged aluminum capacitor plate. An electrostatic coating of the chelating particles was then made by cascading the admixture of particulate chelating agents and carrier, over the commercial polyolefin separator until a particulate coating mass of about 1.1 to 2.0 milligrams per $cm^2$ was achieved. The desired coating mass was about 1.79 milligrams per $cm^2$. Attachment of the particles to the commercial polyolefin separator was then carried out using a Viton® or silicone hot roll fuser operated at 3.3 inches per second or by using a heated plate, flash, radiant, or cold pressure fix hardware with the presence of an electric field to pole the treated battery separator sheets.

To improve adhesion of the particulates to the commercial polyolefin separator, a binder of adhesive polymer was sometimes used. Binders such as poly(4-phenyl-1-butene) or other semi-crystalline polyolefins (e.g., polyhexene, polypentene, etc.) were added as particulates to the chelating particles before the electrostatic printing process or were solution sprayed to fix the coated particles on the commercial polyolefin separator.

Relationship of Permanent Dipole Moment Size to Battery Performance

Separators made with 15-crown-5, 1-aza-15-crown-5, and diaza-15 crown-5 were prepared according to an example of the method disclosed herein. The separators were coated onto separators that were incorporated into $Li_xMn_2O_4$ spinel-graphite coin cells with a solution of 1M $LiPF_6$ salt in an ethylene carbonate-dimethyl carbonate solvent solution. Electrochemical tests were run to determine the effect of the dipole moment on the capacity retention during high temperature cycling. The far right-most column in Table 1 shows the improvements in capacity retention in the cells with macrocycle coated separators relative to the cells with the baseline (uncoated) separator, as well as the dipole moments of the macrocycles calculated in the absence and in the presence of a $Mn^2$ cation.

TABLE 1

| Chelating Agent | Dipole Moment w/o $Mn^{2+}$ ion, Debye | Dipole Moment w/o $Mn^{2+}$ ion, Debye | $Li_xMn_2O_4$ spinel-graphite Cycling Performance Improvement |
|---|---|---|---|
| 15-crown-5 | 2.90 | 0.76 | No |
| 1-aza-15-crown-5 | 5.57 | 5.62 | Yes |
| 1,4-diaza-15-crown-5 | 2.13 | 3.51 | No |

From the results in Table 1, it may be concluded that the dipole moment size of the chelating agent correlates with the observed improvement in capacity retention during high temperature cycling.

It is to be understood that the ranges provided herein include the stated range and any value or sub-range within the stated range. For example, a range from about 0.05% to about 5% should be interpreted to include not only the explicitly recited limits of about 0.05% to about 5%, but also to include individual values, such as 0.08%, 1% etc., and sub-ranges, such as from about 2% to about 3%, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A method for making a planar lithium ion battery component, the method comprising:
 manufacturing the lithium ion battery component using a polymeric chelating agent, the polymeric chelating agent including a polymer having a chelating agent bonded thereto through a linking group; and
 during the manufacturing, applying an electrical poling field to orient a permanent dipole moment of the chelating agent perpendicular to the plane of the lithium ion battery component.

2. The method as defined in claim 1 wherein:
 the manufacturing of the lithium ion battery component includes forming a sheet by extruding a mixture through a dual slot die of an extrusion nozzle at a temperature above a melting point of any polymer in the mixture and below a boiling point of a high boiling point fluid in the mixture, the mixture including i) a pure form of the polymeric chelating agent and the high boiling point fluid or ii) the polymeric chelating agent, an other polymer, and the high boiling point fluid; and
 the applying of the electrical poling field includes applying two opposite DC voltage differences to the dual slot die to achieve two electrical poling fields in opposite directions.

3. The method as defined in claim 1 wherein:
 the lithium ion battery component is one microporous sheet of a microporous separator membrane;
 the manufacturing of the one microporous sheet and the applying of the electrical poling field includes solvent casting a film of the polymeric chelating agent under an applied electric field having a first direction, thereby orienting the permanent dipole moments of the chelating agents in the one sheet in the first direction;
 and the method further comprises:
 manufacturing a second microporous sheet by solvent casting a second film of the polymeric chelating agent under an applied electric field having a second direction that is opposite to the first direction, thereby orienting the permanent dipole moments of the chelating agents in the second microporous sheet in the second direction; and
 laminating the first and second microporous sheets together to form the microporous separator membrane.

4. The method as defined in claim 1 wherein:
 the lithium ion battery component is a microporous membrane;
 the manufacturing of the microporous membrane and the applying of the electrical poling field includes solvent casting a film of the polymeric chelating agent under an applied electric field, thereby orienting the permanent dipole moments of the chelating agents in a direction perpendicular to the microporous membrane; and
 the method further comprises:
 folding the microporous membrane in a lengthwise direction such that two halves of the microporous membrane are in contact with one another; and
 laminating the two halves of the folded microporous membrane together to form a separator.

5. The method as defined in claim 1 wherein:
 the lithium ion battery component is a film for a positive electrode;
 the manufacturing of the film and the applying of the electrical poling field includes solvent casting the polymeric chelating agent under an applied electric field having a first direction, thereby orienting the permanent dipole moments of the chelating agents in the film in the first direction;
 and the method further comprises any of:
 i) manufacturing a second film by solvent casting the polymeric chelating agent under an applied electric field having a second direction that is opposite to the first direction, thereby orienting the permanent dipole moments of the chelating agents in the second film in the second direction;
 laminating the first and second films together,
 applying the laminated first and second films to an electrode structure; or
 ii) folding the film in a lengthwise direction such that two halves of the film are in contact with one another; laminating the two halves of the film; and applying the film to an electrode structure; or
 iii) creating two sheets from the film;
 assembling the two sheets such that respective permanent dipole moments of the two sheets point in opposite directions; and
 applying the two assembled sheets to an electrode structure.

6. The method as defined in claim 1 wherein:
 the lithium ion battery component is a microporous membrane used as a separator, and
 the manufacturing of the microporous membrane and the applying of the electrical poling field includes attaching the chelating agent, through the linking group, to the polymer via a chemical reaction in the presence of an applied electric field.

7. The method as defined in claim 6, further comprising:
   folding the microporous membrane in a lengthwise direction such that two halves of the microporous membrane are in contact with one another and the permanent dipole moments of the chelating agents on the respective halves are oriented in opposite directions; and
   laminating the two halves of the microporous membrane to form the separator.

8. The method as defined in claim 1 wherein:
   the lithium ion battery component is a coated microporous separator membrane; and
   the manufacturing includes:
      attaching the chelating agent to the polymer via a chemical reaction to form the polymeric chelating agent; and
      depositing the polymeric chelating agent onto a microporous membrane in the presence of an applied electric field to form the coated microporous separator membrane.

9. The method as defined in claim 8, further comprising any of:
   i) assembling two of the coated microporous separator membranes together, the two coated microporous separator membranes having the permanent dipole moments of the respective chelating agents oriented in opposite directions; or
   ii) folding the coated microporous separator membrane in a lengthwise direction such that two halves of the coated microporous separator membrane are in contact with one another and the permanent dipole moments of the chelating agents on the respective halves are oriented in opposite directions; and
      laminating the two halves of the coated microporous separator membrane.

10. The method as defined in claim 1 wherein:
    the manufacturing of the lithium ion battery component involves phase separation and extrusion; and
    the applying of the electrical poling field is accomplished i) during the extrusion, or ii) during a solvent extraction process following the extrusion and a stretching process, or iii) during an annealing step subsequent to a solvent extraction process following the extrusion and a stretching process.

11. The method as defined in claim 1 wherein:
    the lithium ion battery component is a coated electrode structure; and
    the manufacturing includes:
       attaching the chelating agent to the polymer through the linking group via a chemical reaction to form the polymeric chelating agent; and
       depositing the polymeric chelating agent onto a surface of an electrode structure in the presence of an applied electric field having a first direction, thereby forming the coated electrode structure.

12. The method as defined in claim 1 wherein the polymer is a poly(1-olefin) and wherein the chelating agent is any crown ether, crown ether having at least one ether oxygen substituted with a heteroatom, podand, lariat ether, calixarene, or calixcrown, having the permanent dipole moment.

13. The method as defined in claim 1 wherein the manufacturing includes applying the polymeric chelating agent by an electrostatic coating process at high temperature, and the applying of the electrical poling field includes applying an electrostatic field during a cool-down of the polymeric chelating agent to room temperature, whereby the direction of the permanent dipole moments becomes fixed.

14. The method as defined in claim 1 wherein:
    the manufacturing of the lithium ion battery component includes extruding a mixture through a slot die of an extrusion nozzle at a temperature above a melting point of any polymer in the mixture and below a boiling point of a high boiling point fluid in the mixture, thereby forming a sheet, the mixture including i) a pure form of the polymeric chelating agent and the high boiling point fluid or ii) the polymeric chelating agent, an other polymer, and the high boiling point fluid;
    the applying of the electrical poling field includes applying a direct current (DC) voltage difference to the slot die to achieve the electrical poling field, whereby the permanent dipole moments of the chelating agents in the sheet are oriented in one direction; and
    the method further includes:
       i) uniaxial or biaxial stretching of the sheet;
       ii) solvent extraction with or without poling;
       iii) exposing the sheet to annealing and cool-down with poling; and
       iv) folding the sheet such that at least some of the permanent dipole moments are oriented in the one direction and at least some other of the permanent dipole moments are oriented in a direction opposite to the one direction, and laminating the folded sheet; or
       v) creating two separate sheets from the sheet, and assembling the two sheets such that respective permanent dipole moments of the two sheets point in opposite directions.

15. A lithium ion battery separator, comprising:
    a planar microporous polymer membrane; and
    a chelating agent bonded to the planar microporous polymer membrane through a linking group such that a permanent dipole moment of the chelating agent is oriented perpendicular to the plane of the planar microporous polymer membrane.

16. A lithium ion battery component, comprising:
    a planar microporous separator or a planar electrode structure; and
    a coating applied to a surface of the planar microporous separator or to a surface of the planar electrode structure, the coating including:
       a microporous polymer matrix; and
       a chelating agent bonded to the microporous polymer matrix through a linking group such that a permanent dipole moment of the chelating agent is oriented perpendicular to the surface of the planar microporous separator or the surface of the planar electrode structure.

17. A lithium ion battery, comprising:
    a positive electrode;
    a negative electrode; and
    a planar microporous separator soaked in an electrolyte, the planar microporous separator disposed between the positive electrode and the negative electrode and including:
       a microporous polymer matrix; and
       a chelating agent bonded to the microporous polymer matrix through a linking group such that a permanent dipole moment of the chelating agent is oriented perpendicular to the plane of the planar microporous separator.

18. The lithium ion battery as defined in claim 17 wherein:
    the microporous polymer matrix includes two films assembled together or two halves folded together, each of the films or halves including a plurality of the chelating agents respectively bonded thereto;

the permanent dipole moment of the plurality of chelating agents bonded to one of the two films or halves is oriented parallel to an internal electric field of the lithium ion battery; and the permanent dipole moment of the plurality of chelating agents bonded to an other of the two films or halves is oriented anti-parallel to the internal electric field of the lithium ion battery.

19. The lithium ion battery as defined in claim 18 wherein a distribution of the parallel oriented permanent dipole moments and the anti-parallel oriented permanent dipole moments is 50/50.

* * * * *